(12) United States Patent
Uhrich et al.

(10) Patent No.: US 10,514,322 B2
(45) Date of Patent: Dec. 24, 2019

(54) METHODS AND APPARATUS FOR ASSESSING TIRE HEALTH

(71) Applicant: Ford Global Technologies, LLC, Dearborn, MI (US)

(72) Inventors: Michael James Uhrich, Wixom, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 15/846,961

(22) Filed: Dec. 19, 2017

(65) Prior Publication Data

US 2019/0187026 A1    Jun. 20, 2019

(51) Int. Cl.
*G01M 17/02*    (2006.01)
*B60C 23/00*    (2006.01)

(52) U.S. Cl.
CPC ............. *G01M 17/02* (2013.01); *B60C 23/00* (2013.01); *B60C 23/002* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/04; B60C 23/0493; B60C 23/0498; B60C 23/0496; B60C 23/064;
B60C 23/0408; B60C 23/041; B60C 23/0411; B60C 23/0488; B60C 23/20; B60C 11/243; B60C 11/246; B60C 23/06; B60C 23/00; B60C 23/0486; B60C 23/061; B60C 11/0083; B60C 13/003;
(Continued)

(56) References Cited

U.S. PATENT DOCUMENTS 3,847,012 A * 11/1974 Sperberg ................. G01L 3/245
                                                  73/8
3,975,708 A *  8/1976 Lusk ........................ G01D 7/04
                                                  340/458
(Continued)

FOREIGN PATENT DOCUMENTS

DE    102006005143    8/2007
JP       3815304      8/2006

OTHER PUBLICATIONS

Indiegogo, ZUS Smart Tire Safety Monitor, retrieved from https://www.indiegogo.com/projects/zus-smart-tire-safety-monitor-2#/, retrieved on Aug. 18, 2017, 11 pages.

*Primary Examiner* — Andre J Allen
(74) *Attorney, Agent, or Firm* — Raymond Coppiellie; Hanley Flight & Zimmerman, LLC

(57) ABSTRACT

Methods and apparatus for assessing tire health are disclosed. An example apparatus includes a vehicle speed sensor, and a processor. The processor of the of the example apparatus to obtain load data for a wheel of a vehicle, obtain speed data for the vehicle, determine a power associated with heating a tire coupled to the wheel based on the load data and the speed data, and determining a condition of the tire based on the power.

20 Claims, 5 Drawing Sheets

(58) Field of Classification Search
CPC .......... B60C 2009/2038; B60C 23/003; B60C 23/004; B60C 23/02; B60C 23/0401; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0406; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28

See application file for complete search history.

(56) References Cited

U.S. PATENT DOCUMENTS

| | | | | |
|---|---|---|---|---|
| 4,805,125 | A * | 2/1989 | Beebe | ................ G01M 17/022 324/76.44 |
| 7,075,421 | B1 | 7/2006 | Tuttle | |
| 9,636,956 | B2 | 5/2017 | Xu | |
| 2003/0058118 | A1* | 3/2003 | Wilson | ................ B60C 23/0423 340/679 |
| 2015/0034222 | A1* | 2/2015 | Martin | ................ B60C 11/243 152/154.2 |
| 2017/0050476 | A1 | 2/2017 | Liu et al. | |
| 2017/0113494 | A1 | 4/2017 | Singh et al. | |

* cited by examiner

METHODS AND APPARATUS FOR ASSESSING TIRE HEALTH

FIELD OF THE DISCLOSURE

This disclosure relates generally to vehicles and, more particularly, to methods and apparatus for assessing tire health.

BACKGROUND

Vehicle tires contact a road surface and directly transfer forces that act on a vehicle. Abnormal tire forces transferred to the vehicle can lead to an uncomfortable driving experience and degraded fuel economy. Abnormal tire forces due to, for example, excessive tire wear, low tire pressure, poor alignment, etc. can also affect driving performance. Thus, it is desirable to know the condition of vehicle tires with respect to driving performance and driving comfort. Monitoring the health of tires of a vehicle can facilitate maintenance and/or replacement of tires that may affect driving performance or driving comfort.

SUMMARY

An example apparatus includes a vehicle speed sensor, and a processor. The processor of the of the example apparatus to obtain load data for a wheel of a vehicle, obtain speed data for the vehicle, determine a power associated with heating a tire coupled to the wheel based on the load data and the speed data, and determining a condition of the tire based on the power.

An example method includes obtaining load data for a wheel of a vehicle, obtaining speed data for the vehicle, determining a power associated with heating a tire coupled to the wheel based on the load data and the speed data, and determining a condition of the tire based on the power.

Another example apparatus includes a vehicle steering sensor; and a processor. The processor of the example apparatus to obtain vehicle steering data of a vehicle, determine a power associated with heating a tire based on the steering data, and determine a condition of the tire based on the power.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
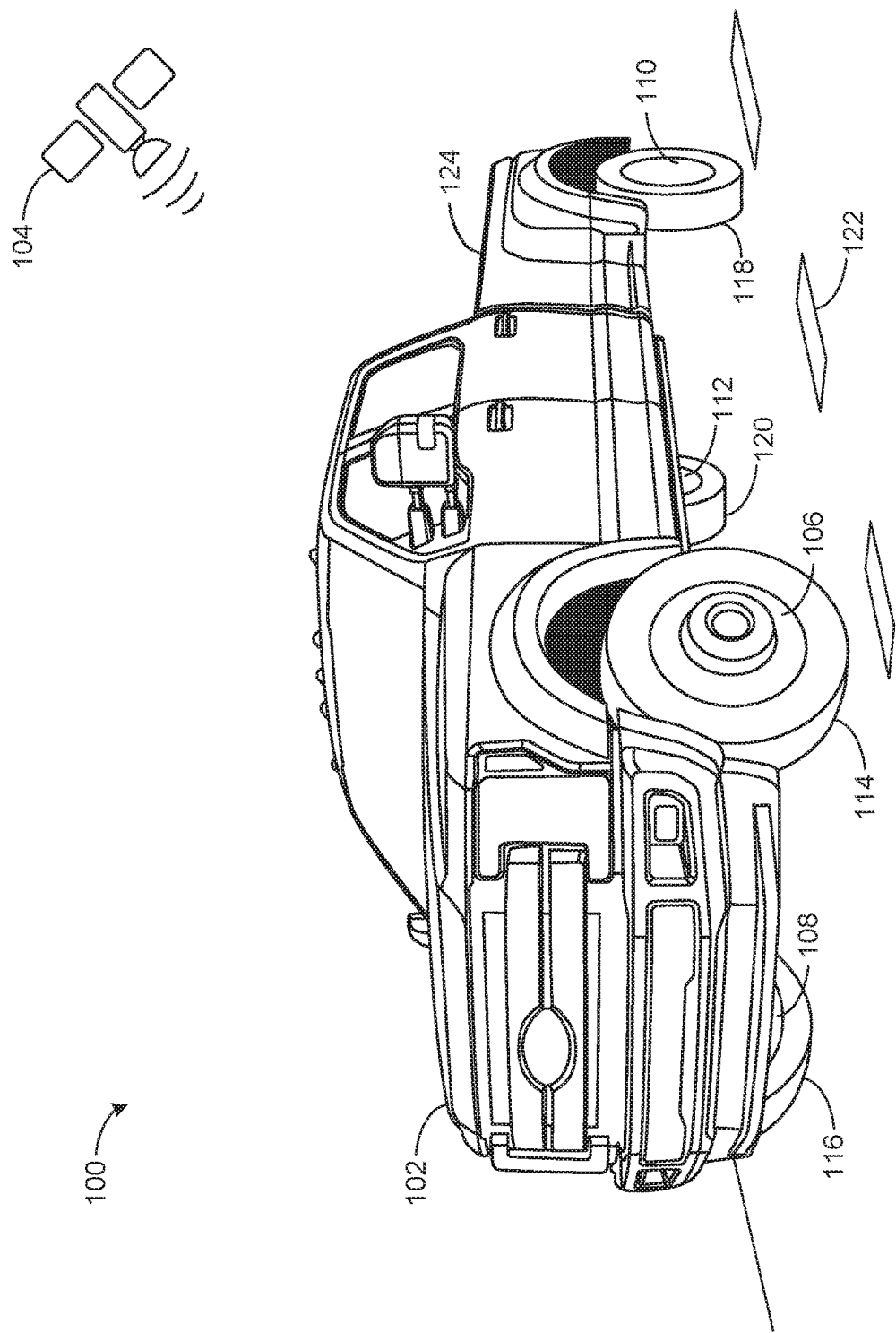
FIG. 1 represents an example environment in which the apparatus and methods disclosed herein may be implemented.

The power associated with heating (i.e., self-heating power) a tire of a vehicle can be used for tire diagnostics. As set forth in the examples described below, the self-heating power of a tire may be determined using speed data derived from a global positioning system and/or a speed sensor, and load data for a wheel of a vehicle on which the tire is mounted. The speed data is processed using a filter prior to being used to determine the self-heating power. The filter used to process the speed data may implement a first order filter, a linear estimation algorithm such as, for example, a Kalman filter, a batch least squares filter, a recursive least squares filter, etc. To increase the accuracy of the results, the speed data and load data maybe synchronized by time shifting the speed data based on a time constant related to temperature rise. After the self-heating power of a tire is determined, a condition of the tire (e.g., tire alignment, tire pressure, etc.) may be determined based on the self-heating power. The condition may be displayed via a driver interface or display. Alternatively or additionally, the condition of the tire may be displayed to an operator or technician via a workstation (e.g., during service of the vehicle, via a connected car information system, etc.).

The self-heating power of the tire can be used to identify excessive self-heating of the tire. Excessive self-heating of a tire may be identified by comparing the self-heating power to a threshold. The self-heating power is determined based on a temperature of the tire, a pressure of the tire, a load of the tire, etc. measured using one or more sensors integrated with the vehicle. If the tire is identified as being subjected to excessive self-heating, an alert may be communicated via the driver interface or display of the vehicle. A determination of excessive self-heating can also be made by monitoring the self-heating power over a period of time and determining a rate at which the self-heating power changes. Alternatively, the determination of excessive self-heating may be made by comparing self-heating power measurements for a given tire to self-heating power measurements of other tires.

In some examples, when determining self-heating power and/or temperature of a tire, the following heating sources may be considered: ambient air via convection, radiant heat via sun load, conduction heating from a road surface, conduction heating from brakes through a rotor and a wheel, self-heating from propulsive force, self-heating from turning force, self-heating related to rolling resistance, and self-heating related to tire alignment (e.g., toe, camber).

The temperature of the tire can be estimated based on the self-heating power of the tire. A tire can be identified as having a high temperature by comparing the temperature of the tire to a threshold temperature, and/or by comparing the temperature of the tire to a temperature of another tire.

To accurately determine the self-heating power of a tire, a rate of change of tire temperature can be determined by, for example, monitoring the tire temperature over a period of time. The rate of change of tire temperature can be used for tire diagnostics. For example, a high rate of change of tire temperature may indicate that there may be an alignment issue (e.g., excessive toe-in). If the tire temperature is high or the rate of change of tire temperature is high, an alert may be presented via a vehicle display. The tire temperature determined based on the self-heating power may also be compared to a tire temperature measured by a temperature sensor to perform diagnostics or to evaluate the operation of the temperature sensor. Alternatively, a change in tire pressure may be used to determine a change of tire temperature.

In addition to speed and load data, steering data may also be used to determine the self-heating power of a tire. For example, steering data may be obtained to determine a turning loss associated with turning the vehicle. The power may be adjusted based on the turning loss to increase the accuracy of determining the condition of a tire.

FIG. 1 represents an example environment 100 in which the apparatus and methods disclosed herein may be implemented. The example environment 100 includes an example vehicle 102 that uses one or more sensors to monitor vehicle systems (e.g., brake systems, tires, etc.). The example vehicle 102 may be a connected vehicle operative to share information via wireless communication (e.g., wireless internet, short-range communication channels, cellular signals). In some examples, the information related to vehicle systems may be shared with a device associated with a driver (e.g., a smart phone, wearable, tablet, etc.) and/or a workstation used by an operator or technician while servicing the vehicle 102.

The example vehicle 102 may be in communication with a system of satellites 104 (e.g., a global positioning system (GPS)). Specifically, the vehicle 102 may be equipped with an integrated navigation system that can communicate with one or more GPS satellites 104 to obtain information, including position and speed of the vehicle 102. The information obtained via the integrated navigation system can then be used by other systems and/or a processor (e.g., the processor 202 of FIG. 2) of the vehicle 102.

The processor (e.g., the processor 202) may also be in communication with one or more other sensors of the vehicle 102. For example, the vehicle 102 includes a plurality of wheels 106, 108, 110, 112 to which respective tires 114, 116, 118, 120 are coupled. The wheels 106, 108, 110, 112 and/or tires 114, 116, 118, 120 may include various sensors (e.g., speed sensors, loading or force sensors, pressure sensors, temperature sensors, etc.) that may be used to determine a condition of one or more of the tires 114, 116, 118, 120. Determining the condition of the tires 114, 116, 118, 120 can facilitate proper maintenance of the tires 114, 116, 118, 120 and/or the vehicle 102. Because the tires 114, 116, 118, 120 are in contact with a road surface 122, forces are transferred between the tires 114, 116, 118, 120 and the vehicle 102. The forces from the tires 114, 116, 118, 120 and/or the road 122 can affect the handling, driving experience, and fuel economy of the vehicle 102. Additionally, a payload in a bed 124 of the vehicle 102 can affect the forces transferred between the tires 114, 116, 118, 120 and the vehicle 102. Abnormal forces may be the result of tire wear, abnormal tire pressure, non-uniform tire loading (e.g., one spare tire, single tire loading), alignment issues (e.g., toe-in, toe-out, camber), etc. and can adversely affect overall performance of the vehicle 102. As used herein, the term "tire" may be used to refer to any of the tires 114, 116, 118, 120 of the vehicle 102.

Figure 2:
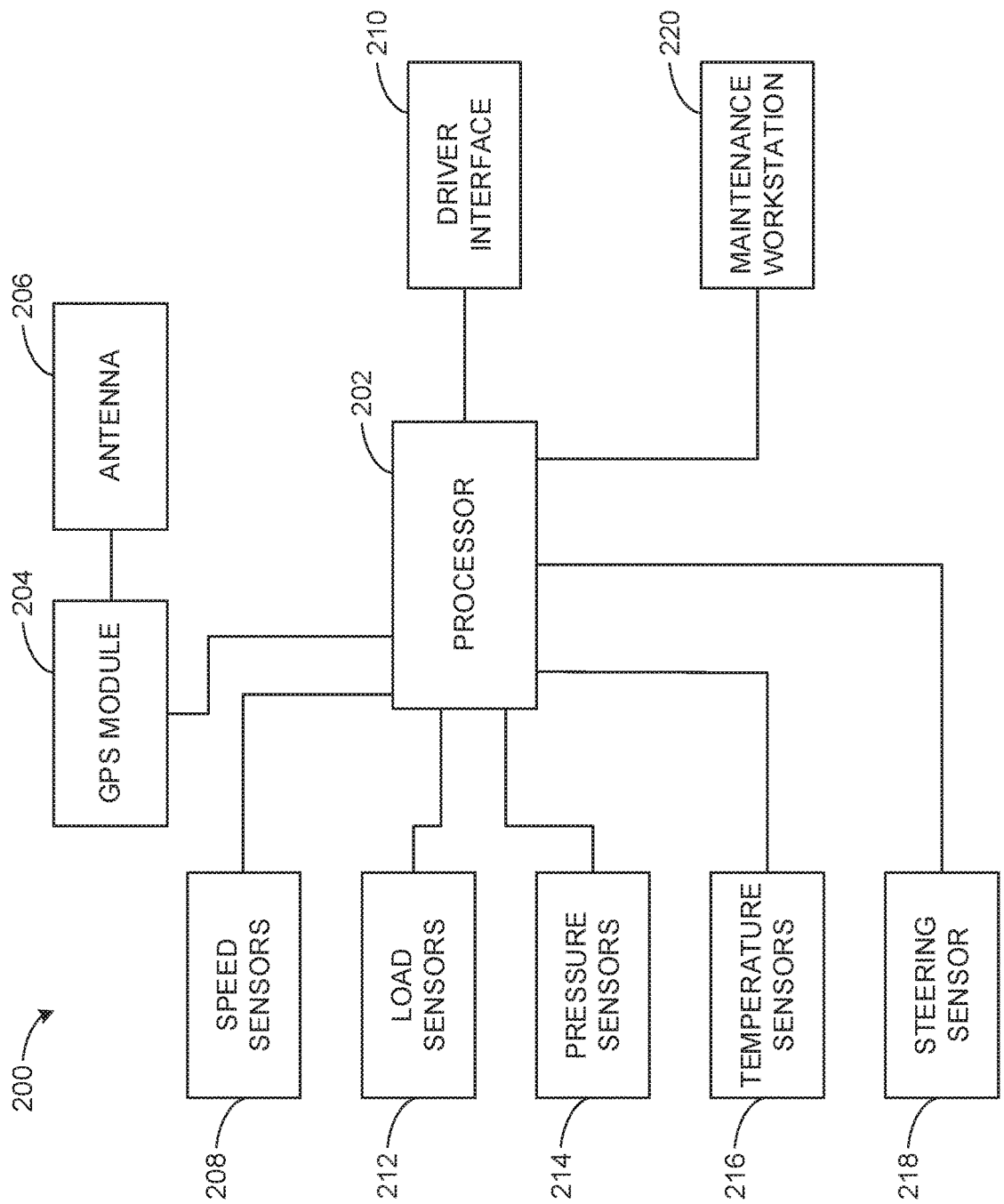
FIG. 2 is a diagram of an apparatus that may be used to implement the example methods described herein.

FIG. 2 is a diagram of an apparatus 200 that may be used in conjunction with the example vehicle 102 of FIG. 1 to implement the example methods described herein. The apparatus 200 includes a processor 202, which may be disposed within the vehicle 102 and operative to communicate with and/or control one or more systems of the vehicle 102. For example, the processor 202 is in communication with the one or more of the GPS satellites 104 via a GPS module 204 associated with the vehicle 102. The GPS module 204 may be an integrated navigation system or any other GPS module 204 operative to communicate with the processor 202. In some examples, the GPS module 204 uses an antenna 206 to communicate with the GPS satellite(s) 104. The GPS module 204 is operative to communicate with the processor 202 via any suitable form of wired or wireless communication. In the examples described herein, the processor 202 obtains speed data from the GPS module 204. Alternatively, the processor 202 may obtain speed data from speed sensors 208.

Additionally, the GPS module 204 may be in communication with a driver interface 210 (e.g., a vehicle display, speakers, etc.) via the processor 202. The driver interface 210 may include a display and/or speakers. The GPS module 204 can communicate with a driver of the vehicle 102 via the driver interface 210 using audible, visual, or audio-visual notifications. The driver interface 210 is also operative to display diagnostic messages related to a condition or health of the tire 114, 116, 118, 120 (e.g., wear, pressure, heating, etc.). In some examples, the driver interface 210 may also indicate the conditions of the tire 114, 116, 118, 120 via an auditory warning (e.g., a sound, a verbal warning).

The example processor 202 is also communicatively coupled to the speed sensors 208 to obtain speed data therefrom. A respective one of the speed sensors 208 is operatively coupled to each of the wheels 106, 108, 110, 112 to measure the speed of the vehicle 102. The speed sensors 208 may be coupled to respective axles on which the wheels 106, 108, 110, 112 are rotatably coupled. Alternatively, the speed sensors 208 are coupled to a different part of the wheel 106, 108, 110, 112 or wheel assembly to obtain the speed of the vehicle 102. The speed sensors 208 may be used for many applications or functions of the vehicle 102 including an anti-lock braking system (ABS), a traction control system (TCS), electronic stability control (ESC), and roll stability control (RSC). The speed sensors 208 are operative to communicate with the processor 202 via any suitable form of wired or wireless communication.

An average static loading of each of the tires 114, 116, 118, 120 is determined using load sensors 212, each of which may be operatively coupled to a respective one of the tires 114, 116, 118, 120 and/or to the vehicle 102 and in communication with the processor 202. The load sensors 212 may be utilized to determine the loading of the vehicle 102. For example, the load sensors 212 may identify that the bed 124 of the vehicle 102 is carrying a payload that increases the load on the rear tires 118, 120. Alternatively, the loading of each of the tires 114, 116, 118, 120 may be determined from a known weight of the vehicle 102.

The pressures of the tires 114, 116, 118, 120 are determined using respective tire pressure sensors 214, which may be operatively coupled to each tire 114, 116, 118, 120 and in communication with the processor 202. Similarly, temperatures of the tires 114, 116, 118, 120 are determined using respective tire temperature sensors 216, which may be operatively coupled to each tire 114, 116, 118, 120 and in communication with the processor 202.

The processor 202 uses the obtained speed data and load data to calculate a power associated with heating each tire 114, 116, 118, 120 of the vehicle 102. However, tire temperature data is inherently delayed relative to the speed data and/or tire power data due to the latency of a temperature rise relative to speed changes. For example, an increase in tire power results in a first order tire temperature rise. To synchronize the speed data with the temperature data, a time delay is introduced by the processor 202 to time shift the speed data to compensate for the latency of the temperature rise. The time delay introduced to the speed data may be an n-order delay. Synchronizing the speed data may increase the accuracy of the power calculated based on the data.

The power associated with self-heating (i.e., self-heating power) is an important health characteristic of the tires 114, 116, 118, 120 and can be used to determine other aspects and/or conditions of the tires 114, 116, 118, 120 under known operational conditions. For example, the self-heating power can be used for diagnostic and prognostic purposes, including determining an alignment issue of the vehicle 102.

The self-heating power may vary based on driving conditions (e.g., driving straight, turning). Thus, an assumption is made that the tires 114, 116, 118, 120 and/or the wheels 106, 108, 110, 112 are operating under rolling, no slip or low slip driving conditions.

The self-heating power is a function of characteristics of the tires 114, 116, 118, 120 including speed, and static and dynamic loading of the vehicle 102. To accurately determine the self-heating power and/or other operational properties derived from the self-heating power, the particular driving conditions on which the self-heating power depends may be isolated. A load on the tire 114, 116, 118, 120 may vary. Knowing the load on the tire 114, 116, 118, 120 facilitates accurate calculation of the self-heating power of the tire 114, 116, 118, 120. For example, the front tires 114, 116 typically carry a greater load than the rear tires 118, 120 because the vehicle 102 is front heavy. However, when a payload is in the bed 124 of the vehicle 102, the rear tires 118, 120 may carry a greater load than the front tires 114, 116. Additionally, the payload in the bed 124 of the vehicle 102 may not be centered, and, as a result, one of the rear tires 118, 120 may carry more of the load than the other one of the rear tires 118, 120. Further, the payload in the bed 124 of the vehicle 102 may shift while the vehicle 102 is driving, thereby shifting the load from one of the rear tires 118, 120 to the other one of the rear tires 118, 120. As such, the load may vary and increase/decrease the self-heating power of the tires 114, 116, 118, 120. Therefore, it is beneficial to be able to detect the load on each of the tires 114, 116, 118, 120 to facilitate accurate calculation of the self-heating power of the tires 114, 116, 118, 120.

For applications where speed data obtained via the GPS module 204 and/or the speed sensors 208, and load data obtained from the load sensors 212 are available, the power can be determined using Equation 1, where $L_T$ is the load of the tire 114, 116, 118, 120, $C_{RR}$ is the rolling resistance coefficient, and $S_V$ is the vehicle speed. After the speed data is synchronized (e.g., compensated for latency of temperature rise), the self-heating power of a tire is determined using Equation 1.

$$P_{SH}=L_T*C_{RR}*S_V \quad\quad\quad \text{Equation 1}$$

It is assumed when using Equation 1 that the wheel 106, 108, 110, 112 and tire 114, 116, 118, 120 are operating under free rolling conditions and are not exposed to any longitudinal slip or slide conditions. Under straight, constant driving conditions, the rolling speed (e.g., linear speed) of the tire 114, 116, 118, 120 is equivalent to the speed obtained by the GPS module 204 and/or the speed sensor 208. Alternatively, the self-heating power may be determined by summing a measured propulsive power, braking power, and turning power together with an expected self-heating power increase from environmental conditions.

The processor 202 may also use a digital filter employing an online estimation technique to determine the self-heating power in real-time using Equation 1. The online estimation technique enables the processor 202 to continuously determine the self-heating power while the vehicle 102 is in motion. Alternatively, the self-heating power of the tire 114, 116, 118, 120 may be determined offline and calculated for batches of data (e.g., a plurality of data points for speed and load) and updated periodically as additional data is obtained. The digital filter may also reduce noise or extraneous data points in the speed data, the load data, and/or the calculated self-heating power. The self-heating power data may include a self-heating power calculated for each data point of the speed data and the load data and may be filtered after the self-heating power is determined. The digital filter may implement a first order filter, a linear estimation algorithm such as, for example, a Kalman filter, a batch least squares filter, a recursive least squares filter, etc., to filter the speed data. The digital filter is operative to filter extraneous data points while determining the self-heating power of the tire 114, 116, 118, 120. For example, the speed data may be processed using a Kalman filter, which filters the data and also calculates the self-heating power using Equation 1. Alternatively, a separate filter may be implemented prior to determining the self-heating power to filter extraneous data points from the speed data. Alternatively, the self-heating power may be calculated using unfiltered speed data and the digital filter may be applied to the resulting self-heating power data.

Alternatively, the rolling resistance of the vehicle 102 may be used to calculate the self-heating power of the tire 114, 116, 118, 120. In some examples, the rolling resistance of a vehicle is approximately equal to the tire power. Alternatively, the rolling resistance may be determined for a vehicle with a specific payload. As such, as a first approximation, the self-heating power of the tire 114, 116, 118, 120 may be distributed in proportion to tire load. For example, the vehicle 102 may have a rolling resistance of 6 kW at 60 mph. As such, each tire 114, 116, 118, 120 may have a self-heating power of 1.5 kW. In examples when the vehicle 102 is turning, the self-heating power based on rolling resistance may be modified based on at least one of a propulsive tire slip angle, a braking tire slip angle, and/or a steering tire slip angle.

The conditions of the tires 114, 116, 118, 120 can be determined based on the calculated self-heating power. Using the online estimation technique to determine the self-heating power enables the condition of each tire 114, 116, 118, 120 to be monitored in substantially real-time. For example, as additional load and speed data is collected over time, the self-heating power is re-calculated using the additional data and, thus, the conditions determined using the self-heating power can be updated, thereby enabling the conditions of the tires 114, 116, 118, 120 to be monitored in real time. Conditions of the tires 114, 116, 118, 120 that can be determined using the self-heating power include excessive self-heating, temperature, abnormal loading (e.g., due to a spare tire being used), etc. For example, if the self-heating power of a single tire 114, 116, 118, 120 is significantly higher than the self-heating powers of the other tires 114, 116, 118, 120, the processor 202 may determine that the single tire 114, 116, 118, 120 is experiencing abnormal loading, which may indicate that the tire 114, 116, 118, 120 is a spare tire and/or is underinflated or flat. In some examples, a self-heating power for one front tire 114 may be compared to a self-heating power for the other front tire 116. If no power difference is identified, the combined self-heating power of the front tires 114 and 116 may be compared to a combined self-heating power for the rear tires 118 and 120. If a self-heating power for either pair is higher than the other a condition of the tires may be determined. For example, the front tires 114 and 116 may have a higher combined self-heating power than the rear tires 118 and 120 because of an alignment issue.

A turning loss (i.e., a turning power) of the tires 114, 116, 118, 120 can also be determined when steering data is obtained from a steering sensor 218, which may be operatively coupled to a steering system of the vehicle 102 and in communication with the processor 202.

Equation 2 is used to determine the turning loss, where $L_F$ is the lateral force on the tire 114, 116, 118, 120, $L_V$ is the lateral velocity of the tire 114, 116, 118, 120, and $C_{SLIP}$ is the slip coefficient. In some examples, the slip coefficient may be calculated in real-time. For example, measuring a wheel speed ratio near coasting, and measuring a wheel speed ratio near zero torque yields a slip coefficient that can be utilized in Equation 2. Alternatively, the slip coefficient may be utilized along with a measured propulsive power of the vehicle 102 engine to determine the self-heating power.

$$P_{TL} = L_F * L_V * C_{SLIP} \qquad \text{Equation 2}$$

After the turning loss is determined, the self-heating power may be adjusted (e.g., turning loss added to the self-heating power) based on the turning loss. For example, the self-heating power for the tires 114, 116 may experience 70% of the turning loss and the self-heating power may be adjusted accordingly. As such, during a comparison between the self-heating power of the front tires 114 and 116 and the self-heating power of the rear tires 118 and 120 it is expected that the self-heating power of the front tires 114, 116 will be higher than the self-heating power of the rear tires 118, 120 based on the turning loss adjustment.

The self-heating power and a pressure measurement can also be used to determine temperatures of the tires 114, 116, 118, 120. The self-heating power also corresponds to a pressure change in a tire 114, 116, 118, 120. For example, self-heating power tends to increase as tire pressure decreases. The example method to indirectly measure the temperature of the tires 114, 116, 118, 120 estimates the pressures of the tires 114, 116, 118, 120 based on the estimated self-heating power and known pressures of the tires 114, 116, 118, 120 (e.g., a previously measured or determined pressure of the tire 114, 116, 118, 120). More specifically, the temperature of the tires 114, 116, 118, 120 is estimated using the self-heating power and pressures of the tires 114, 116, 118, 120 determined using a tire temperature model based on the following heating sources: ambient air via convection, radiant heat via sun load, conduction heating from a road surface, conduction heating from brakes through a rotor and a wheel, self-heating from propulsive force, self-heating from turning force, self-heating related to rolling resistance, and self-heating related to alignment (e.g., toe, camber). Alternatively, the temperature of the tires 114, 116, 118, 120 may be determined by thermal modeling using the self-heating power as a power input.

Based on the estimated temperatures of the tires 114, 116, 118, 120, a recommendation or alert can be communicated to a driver of the vehicle 102. For example, if the temperature of the tires 114, 116, 118, 120 is high, an alert can be communicated to the driver interface 210 indicating the high temperature. In some examples, to determine whether the temperatures of the tire 114, 116, 118, 120 is high, the temperatures are compared to a preset threshold value (e.g., a maximum safe temperature for the tire 114, 116, 118, 120) and/or a measured temperature of the tire 114, 116, 118, 120 measured by the temperature sensors 216. If the determined temperature is higher than the threshold temperature and/or the measured temperature, a recommendation is made via the driver interface 210. If the determined temperatures of the tire 114, 116, 118, 120 is lower than the threshold temperature, the apparatus may continue monitoring the temperatures of the tire 114, 116, 118, 120. Additionally, a change in temperature of the tires 114, 116, 118, 120 may be monitored and/or recorded. Based on the change in temperature, diagnostics can determine if one or more tires 114, 116, 118, 120 has a defect causing an increase in temperature of the tire 114, 116, 118, 120.

The processor 202 may also be operatively coupled to a maintenance workstation 220. In some examples, the vehicle 102 and, thus, the processor 202, are coupled to the maintenance workstation 220 when the vehicle 102 is brought in for service. Alternatively, the vehicle 102 may be in communication with the maintenance workstation 220 using a wireless connection. In some such examples, the vehicle 102 is a connected vehicle 102, thus all vehicle data, including the determined power data, is available to a technician (e.g., an operator, a mechanic, an engineer) via the maintenance workstation 220. The vehicle data may be used for diagnostics, or other purposes such as general vehicle performance monitoring and data gathering. For example, the technician may use the vehicle data to determine how long a tire 114, 116, 118, 120 lasts under certain conditions to make more accurate predictions about remaining life of the tires 114, 116, 118, 120.

While an example manner of implementing the example apparatus 200 of FIG. 2 is illustrated, one or more of the elements, processes and/or devices illustrated in FIG. 2 may be combined, divided, re-arranged, omitted, eliminated and/or implemented in any other way. Further, the example processor 202, the example GPS module 204, the example speed sensor 208, the example driver interface 210, the example load sensor 212, the example pressure sensor 214, the example temperature sensor 216, the example steering sensor 218, and/or, more generally, the example apparatus 200 of FIG. 2 may be implemented by hardware, software, firmware and/or any combination of hardware, software and/or firmware. Thus, for example, any of the example processor 202, the example GPS module 204, the example speed sensor 208, the example driver interface 210, the example load sensor 212, the example pressure sensor 214, the example temperature sensor 216, the example steering sensor 218, and/or, more generally, the example apparatus 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example processor 202, the example GPS module 204, the example speed sensor 208, the example driver interface 210, the example load sensor 212, the example pressure sensor 214, the example temperature sensor 216, the example steering sensor 218, and/or, more generally, the example apparatus 200 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 200 of FIG. 2 may include one or more elements, processes and/or devices in addition to, or instead of, those illustrated in FIG. 2, and/or may include more than one of any or all of the illustrated elements, processes and devices.

Figure 3:
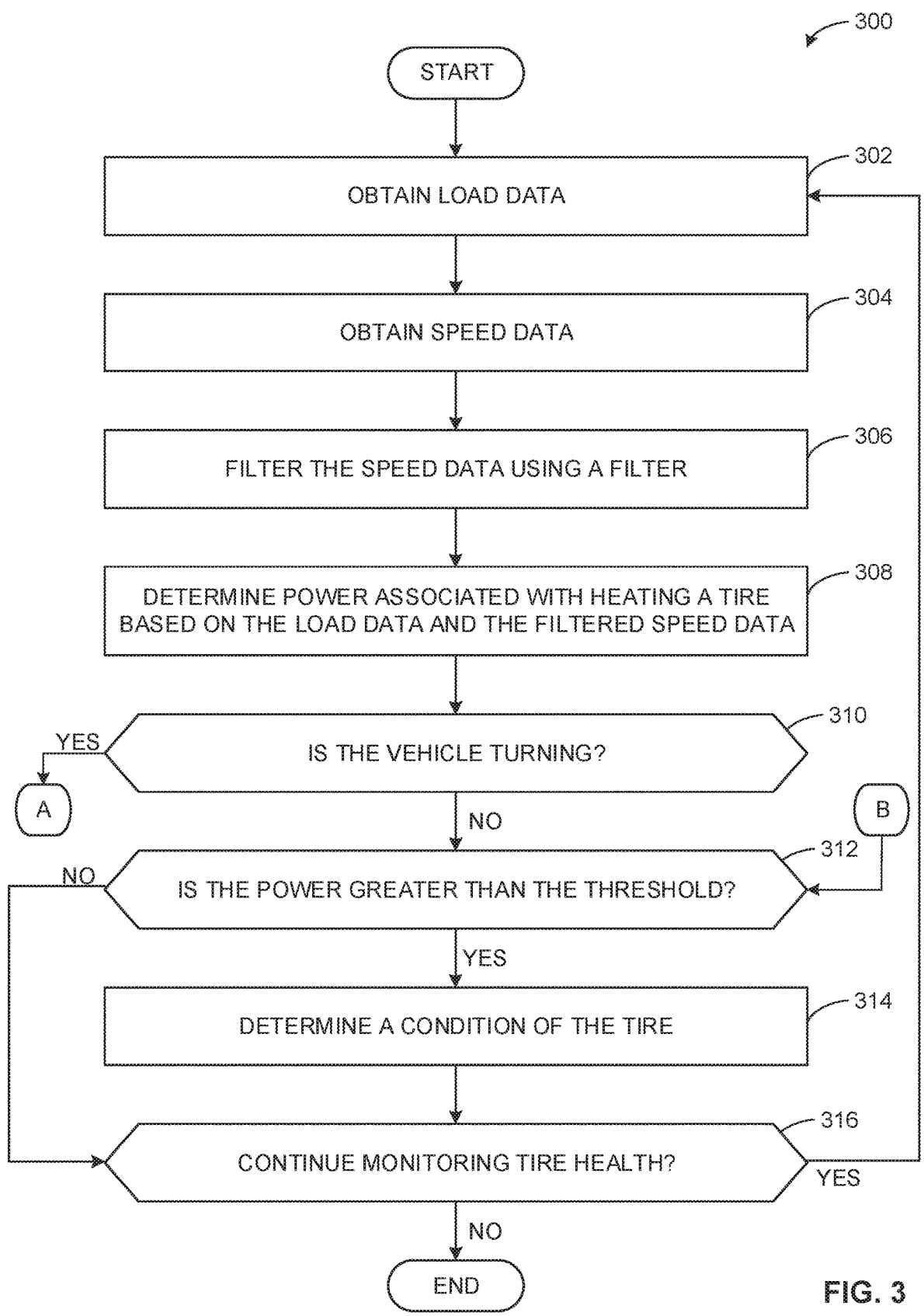
FIGS. 3 and 4 are example flowcharts representative of the example methods implemented by the apparatus described herein.
Figure 4:
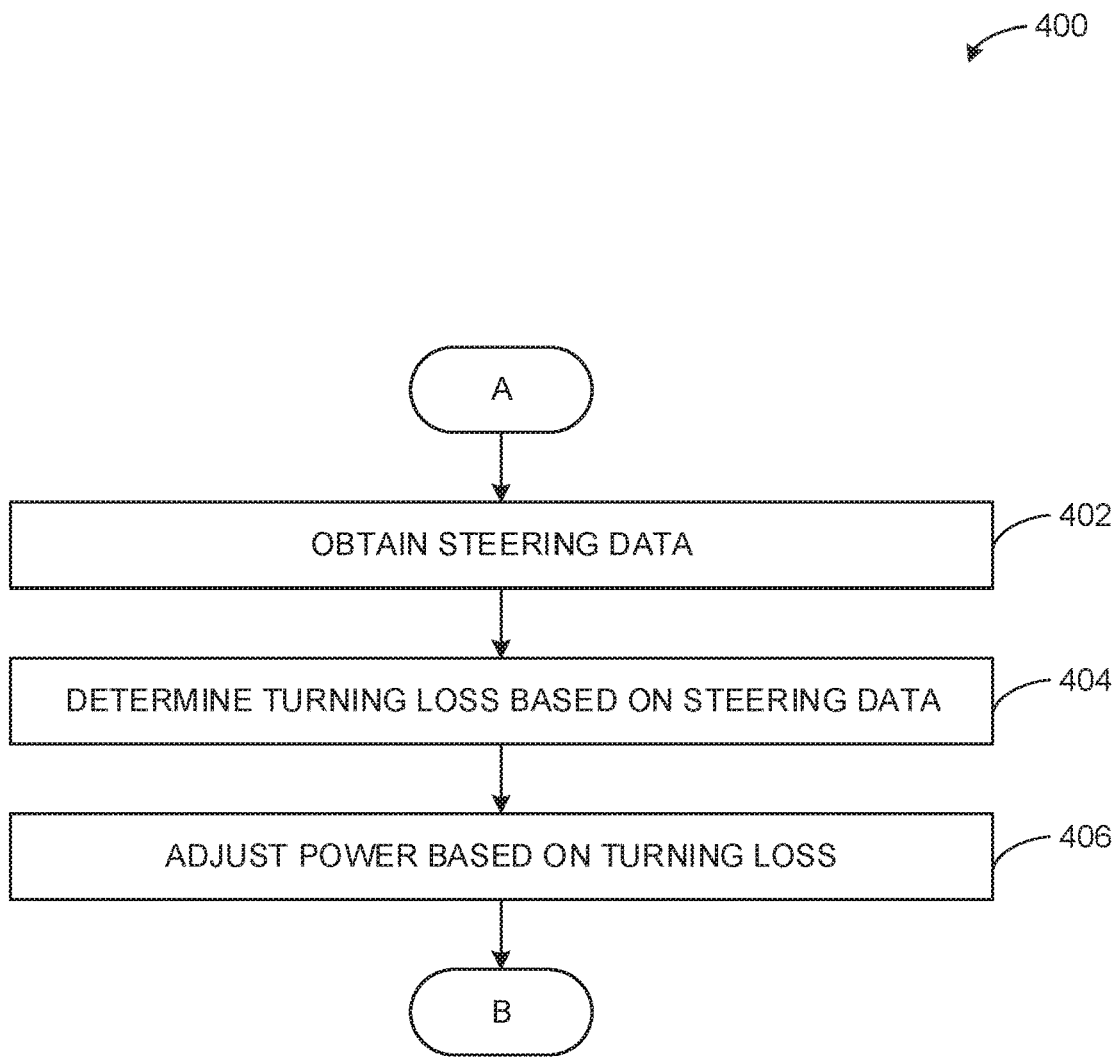

Example flowcharts representative of example methods for implementing the apparatus 200 of FIG. 2 are shown in FIGS. 3 and 4. The example methods may be implemented using machine readable instructions that comprise a program for execution by a processor, such as the processor 202 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 202, but the entire program and/or parts thereof could alternatively be executed by a device other than the processor 202 and/or embodied in firmware or dedicated hardware. Further, although the example program is described with reference to the flowcharts illustrated in FIGS. 3 and 4, many other methods of implementing the example apparatus 200 may alternatively be used. For example, the order of execution of the blocks may be changed, and/or some of the blocks described may be changed, eliminated, or combined.

As mentioned above, the example methods of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example methods of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 3 is a flowchart representative of an example method 300 implemented by the apparatus 200 described herein. The example method 300 begins by obtaining load data of the vehicle 102 (block 302). The load data may be obtained via the load sensors 212 of the vehicle 102. The method 300 also includes obtaining speed data from the speed sensors 208 of the vehicle 102 (block 304). The load data and the speed data may be obtained simultaneously or in any order. After the load data and the speed data are obtained, the speed data is filtered (block 306). The speed data may be filtered by applying an n-order delay to the speed data.

After the speed data is filtered, a power associated with heating a tire 114, 116, 118, 120 is determined based on the load data and the filtered speed data (block 308). For example, the self-heating power of a tire 114, 116, 118, 120 is determined using Equation 1. It is then determined if the vehicle 102 is turning (block 310). For example, the processor 202 determines if the vehicle 102 is turning by obtaining steering data from the steering sensor 218. Alternatively, the processor 202 may determine that the vehicle 102 is turning by comparing the instantaneous speeds of the wheels 106, 108, 110, 112 to one another. If the vehicle is not turning, it is determined if the self-heating power is greater than the threshold (block 312). For example, it is determined if the self-heating power is greater than a determined power for the load data and filtered speed data under ideal conditions (e.g., no slip, no alignment issues, etc.). If the self-heating power is greater than the threshold, the processor 202 determines a condition of the tire 114, 116, 118, 120 (block 314). If the self-heating power is not greater than the threshold, the processor 202 determines whether or not to continue monitoring tire health (block 316). If the processor 202 is to continue monitoring tire health, the method 300 returns to block 302 to obtain updated data. If the processor 202 is not to continue monitoring tire health, the method 300 ends.

If it is determined that the vehicle is turning at block 310, the method 300 proceeds to block 402 to initiate the method 400 of FIG. 4. The example method 400 begins by obtaining steering data (block 402). The steering data may be obtained via the steering sensor 218. After the steering data is obtained, the processor 202 determines a turning loss based on the steering data (block 404). The processor 202 adjusts the self-heating power based on the turning loss (block 406) and the method 400 returns to block 312 of the method 300 of FIG. 3 to determine if the power is greater than the threshold. For example, it is determined if the power is greater than a determined power for the load data, the filtered speed data and the steering data under ideal conditions (e.g., no slip, no alignment issues, etc.).

Figure 5:
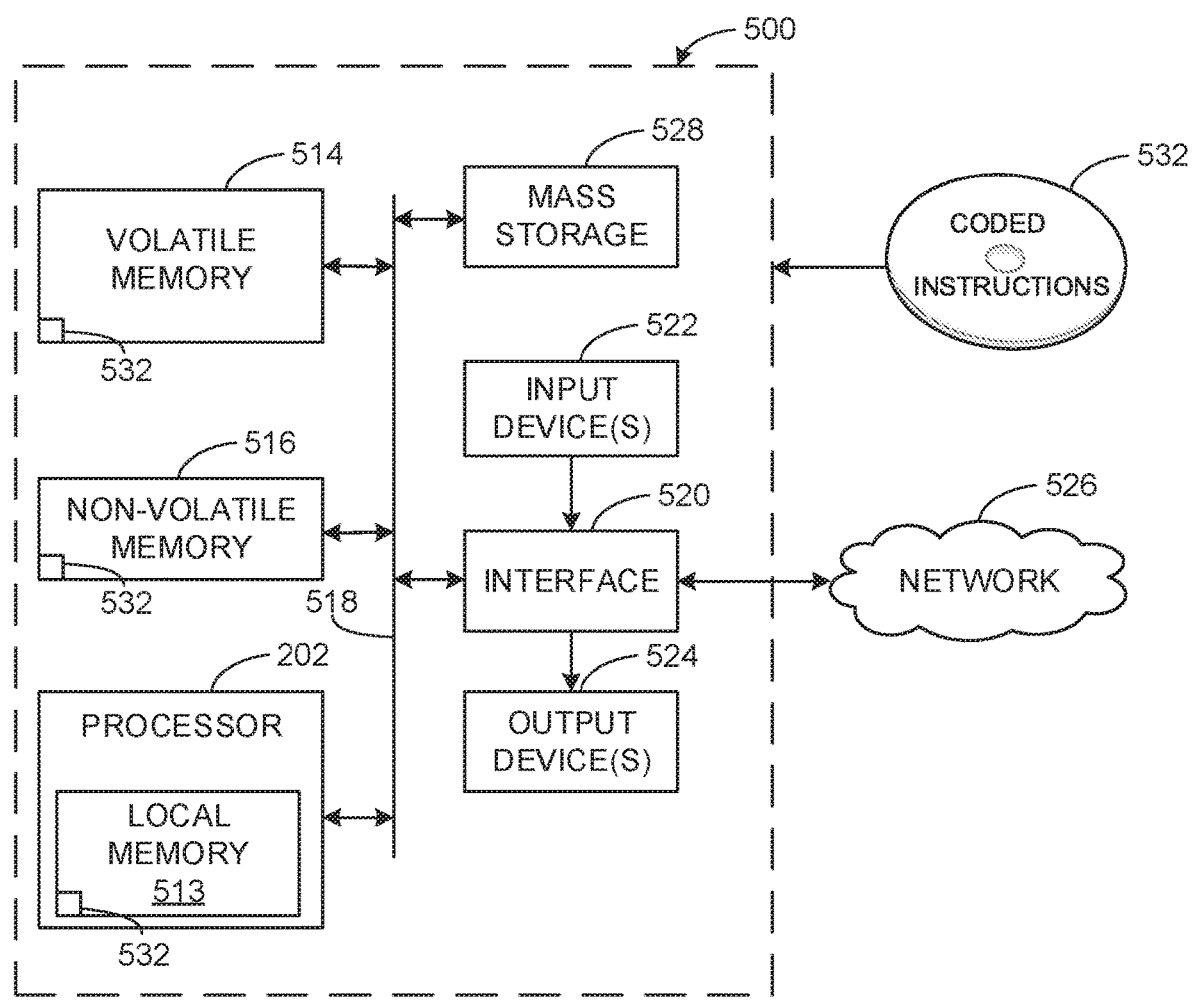
FIG. 5 is an example processor platform that may be used with the example apparatus of FIG. 2 and/or the example methods of FIGS. 3 and 4.

FIG. 5 is a block diagram of an example processor platform 500 capable of executing instructions to implement the methods of FIGS. 3 and 4 and the apparatus of FIG. 2. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes the processor 202. The processor 202 of the illustrated example is hardware. For example, the processor 202 can be implemented by one or more integrated circuits, logic circuits, microprocessors or controllers from any desired family or manufacturer.

The processor 202 of the illustrated example includes a local memory 513 (e.g., a cache). The processor 202 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 (e.g., the speed sensor 208, the driver interface 210, the load sensor 212, the pressure sensor 214, the temperature sensor 216, the steering sensor 218, etc.) are connected to the interface circuit 520. The input device(s) 522 permit(s) a user to enter data and commands into the processor 202. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 (e.g., the driver interface 210, the maintenance workstation 220) are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

Coded instructions 532 to implement the methods of FIGS. 3 and 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture enable a processor of a vehicle to effectively monitor the health of the tire on the vehicle using the power associated with heating a tire, which is calculated using load data and speed data from sensors. Additionally, the disclosed methods take into account the various heating sources of the tire, which provides a more accurate determination of a condition of a tire.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a vehicle speed sensor; and
a processor to:
obtain load data for a wheel of a vehicle, obtain speed data for the vehicle, determine a power associated with heating a tire coupled to the wheel based on the load data and the speed data, and determining a condition of the tire based on the power.

2. The apparatus of claim 1, further including a temperature sensor to determine a temperature for the tire prior to determining the power.

3. The apparatus of claim 1, wherein the processor is to process the speed data using a filter.

4. The apparatus of claim 3, wherein the filter uses a linear estimation algorithm.

5. The apparatus of claim 4, wherein the linear estimation algorithm implements at least one of a Kalman filter, a batch least squares filter, or a recursive least squares filter.

6. The apparatus of claim 1, wherein the processor is to determine if the power is greater than a threshold.

7. The apparatus of claim 6, wherein the threshold is an expected power for the load data and the speed data.

8. The apparatus of claim 1, wherein the processor is to indicate the condition of the tire via a display of the vehicle.

9. The apparatus of claim 1, wherein the processor is to determine a temperature of the tire when determining the condition of the tire.

10. The apparatus of claim 1, wherein the processor is to determine a pressure of the tire when determining the condition of the tire.

11. A method comprising:
obtaining load data for a wheel of a vehicle;
obtaining speed data for the vehicle;
determining a power associated with heating a tire coupled to the wheel based on the load data and the speed data; and
determining a condition of the tire based on the power.

12. The method of claim 11, further including determining if the power is greater than a threshold.

13. The method of claim 12, wherein the threshold is an expected power for the load data and the speed data.

14. The method of claim 11, further including indicating the condition of the tire via a display of the vehicle.

15. An apparatus comprising:
a vehicle steering sensor; and
a processor to:
obtain vehicle steering data of a vehicle, determine a power associated with heating a tire based on the steering data, and determine a condition of the tire based on the power.

16. The apparatus of claim 15, wherein the processor is to determine a turning loss measurement based on the steering data.

17. The apparatus of claim 15, wherein the processor is to obtain load data for a wheel of the vehicle and speed data for the vehicle.

18. The apparatus of claim 15, wherein the processor is to determine if the power is greater than a threshold.

19. The apparatus of claim 18, wherein the threshold is an expected power for the steering data, the load data and the speed data.

20. The apparatus of claim 15, wherein the processor is to indicate the condition of the tire via a display of the vehicle.

* * * * *